(12) United States Patent
Barger

(10) Patent No.: US 9,616,990 B2
(45) Date of Patent: Apr. 11, 2017

(54) AIRCRAFT COMPONENT ROTARY DEVICE

(71) Applicant: HAMILTON SUNDSTRAND CORPORATION, Windsor Locks, CT (US)

(72) Inventor: Victor Barger, Lake in the Hills, IL (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 218 days.

(21) Appl. No.: 14/486,443

(22) Filed: Sep. 15, 2014

(65) Prior Publication Data

US 2016/0016653 A1    Jan. 21, 2016

Related U.S. Application Data

(60) Provisional application No. 62/026,310, filed on Jul. 18, 2014.

(51) Int. Cl.
| | |
|---|---|
| *B64C 9/30* | (2006.01) |
| *F16D 65/18* | (2006.01) |
| *F16D 59/00* | (2006.01) |
| *F16H 13/04* | (2006.01) |
| *F16H 57/00* | (2012.01) |
| *B64C 13/28* | (2006.01) |
| *F16D 125/36* | (2012.01) |

(52) U.S. Cl.
CPC ............. *B64C 9/30* (2013.01); *B64C 13/28* (2013.01); *F16D 59/00* (2013.01); *F16D 65/18* (2013.01); *F16H 13/04* (2013.01); *F16H 57/0006* (2013.01); *F16D 2125/36* (2013.01)

(58) Field of Classification Search
CPC .................................. B64C 13/32; B64C 9/30
See application file for complete search history.

(56) References Cited

U.S. PATENT DOCUMENTS

| | | |
|---|---|---|
| 2,063,445 A | 12/1936 | Lambert |
| 2,089,996 A | 8/1937 | Fast |
| 2,675,898 A | 4/1954 | Morgan |
| 3,722,641 A | 3/1973 | Kusiak |
| 4,176,733 A | 12/1979 | Twickler |
| 1,774,144 A | 8/1980 | Jones |
| 4,352,415 A | 10/1982 | Powell |
| 4,480,733 A * | 11/1984 | Grimm .................. B64C 13/28 192/223.3 |
| 4,483,429 A | 11/1984 | Tiedeman |
| 4,582,187 A | 4/1986 | Sekella |

(Continued)

FOREIGN PATENT DOCUMENTS

JP    2000097308    4/2004

*Primary Examiner* — Mark Manley
(74) *Attorney, Agent, or Firm* — Cantor Colburn LLP

(57) ABSTRACT

A rotary device assembly is provided and includes an input shaft coupled to a torque generating device, an output shaft and a rotary device disposed to transmit first torque from the input shaft to the output shaft and configured with no-back capability to prevent second torque applied to the output shaft from being transmitted to the input shaft in an event the second torque deceeds a torque-limiting threshold and the no-back capability and torsional lock-up capability to prevent an overload of the torque generating device in an event the second torque exceeds the torque-limiting threshold.

11 Claims, 6 Drawing Sheets

(56) References Cited

U.S. PATENT DOCUMENTS

| | | | |
|---|---|---|---|
| 4,693,349 A | 9/1987 | Tysver | |
| 4,697,672 A | 10/1987 | Linton | |
| 4,850,458 A | 7/1989 | Allan | |
| 4,909,363 A | 3/1990 | Trommer | |
| 5,090,529 A | 2/1992 | Fahy | |
| 5,299,676 A | 4/1994 | Wade | |
| 5,353,901 A | 10/1994 | Jacques | |
| 5,630,490 A | 5/1997 | Hudson | |
| 5,943,911 A | 8/1999 | Beckerman | |
| 5,944,148 A | 8/1999 | Bae | |
| 6,202,803 B1 | 3/2001 | Lang | |
| 6,419,606 B1 * | 7/2002 | Tengan | B64C 13/28 475/254 |
| 6,631,797 B2 | 10/2003 | Capewell | |
| 6,814,209 B1 | 11/2004 | Acosta | |
| 7,143,888 B2 | 12/2006 | Lang | |
| 7,163,097 B2 | 1/2007 | Acosta | |
| 8,215,471 B2 | 7/2012 | Wasser | |
| 8,220,598 B2 | 7/2012 | Valembois | |
| 8,511,441 B2 | 8/2013 | Lang | |
| 2003/0051950 A1 | 3/2003 | Harvey | |
| 2004/0035653 A1 | 2/2004 | Christensen | |
| 2004/0040813 A1 | 3/2004 | Darby | |
| 2012/0080283 A1 * | 4/2012 | Lang | B64C 13/28 192/54.5 |

* cited by examiner

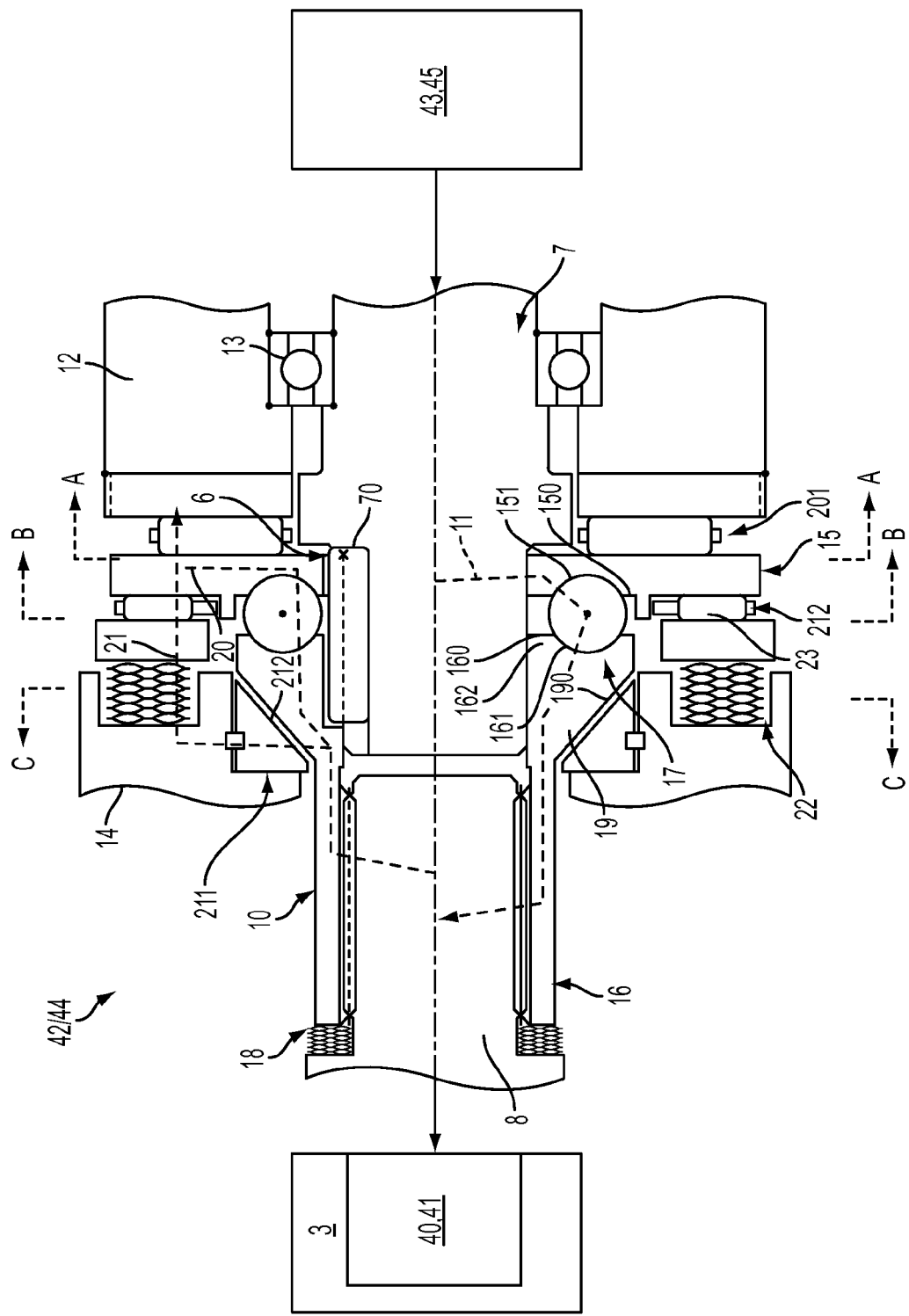

AIRCRAFT COMPONENT ROTARY DEVICE

CROSS-REFERENCE TO RELATED APPLICATION

This is a non-provisional application that claims the benefit of priority to U.S. Provisional Application No. 62/026,310, which was filed on Jul. 18, 2014. The entire disclosures of U.S. Provisional Application No. 62/026,310 are incorporated herein by reference.

BACKGROUND OF THE INVENTION

The subject matter disclosed herein relates to a rotary device and, more particularly, to a rotary device with no-back and torque-limiting capabilities.

An aircraft utilizes actuation systems for control of aircraft flight surfaces. Such actuation systems transmit torque to actuators through torque transmission devices including torque tubes, gear boxes and bearing supports. If a disconnection failure occurs to a torque transmission device, a no-back will prevent a loss of position control for a given flight surface by grounding the resultant torque generated by airloads on the flight control surface to a structural ground and thereby lock the surface in a fixed position.

With such flight control actuation systems, it is often necessary to mitigate an overload condition generated by a structural jam. One method to accomplish overload mitigation is to have a torque limiting device within the actuation system such that the actuator output torque is limited by a mechanism within an actuator by transferring torque to structural ground if the limit is exceeded.

BRIEF DESCRIPTION OF THE INVENTION

According to one aspect of the invention, a rotary device assembly is provided and includes an input shaft coupled to a torque generating device, an output shaft and a rotary device disposed to transmit first torque from the input shaft to the output shaft and configured with no-back capability to prevent second torque applied to the output shaft from being transmitted to the input shaft, and the no-back capability and torsional lock-up capability to prevent an overload of the torque generating device in an event the second torque exceeds the torque-limiting threshold.

According to another aspect of the invention, a flight control actuation system is provided and includes a static surface, a dynamic surface, which is pivotable relative to the static surface and a rotary device assembly operably coupled to the static and dynamic surfaces and configured to transmit first torque from an input shaft to an output shaft to control a pivoting of the dynamic surface with independently pre-loaded no-back capability to prevent second torque applied to the output shaft from being transmitted to the input shaft, and the no-back capability and torsional lock-up capability to prevent an overload of a torque generating device to which the input shaft is coupled in an event the second torque exceeds the torque-limiting threshold.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 4 is a side view of a rotary device in accordance with embodiments;

The detailed description explains embodiments of the invention, together with advantages and features, by way of example with reference to the drawings.

DETAILED DESCRIPTION OF THE INVENTION

A hybrid torque-limiting rotary no-back device with independent pre-loading is provided. The rotary no-back device may be integrated within an aircraft flight control actuation system, such as a flap and/or slat high lift system. The no-back capability of the device will prevent an aircraft flight control surface from being displaced from a desired position if a failure occurs to the actuation system's drive line. A torque-limiting capability of the device will prevent overload of the aircraft structure when the actuation system is loaded beyond the torque-limiting threshold.

Figure 1:
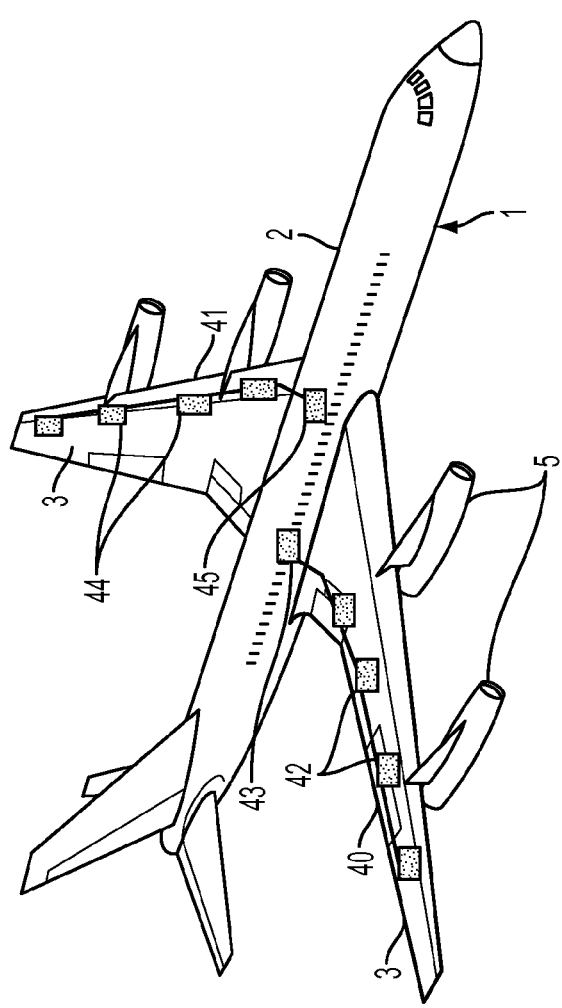
FIG. 1 is a perspective view of an aircraft in accordance with embodiments.
Figure 2:
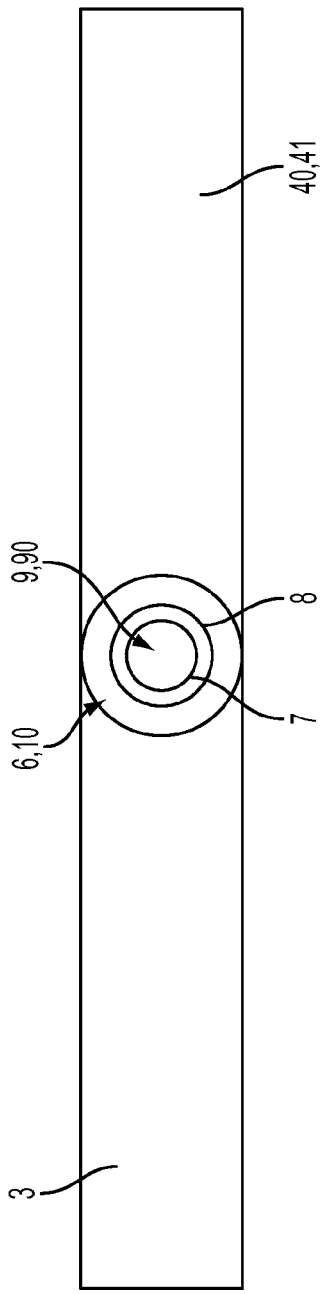
FIG. 2 is a view of aerodynamic surfaces of the aircraft of FIG. 1.
Figure 3:
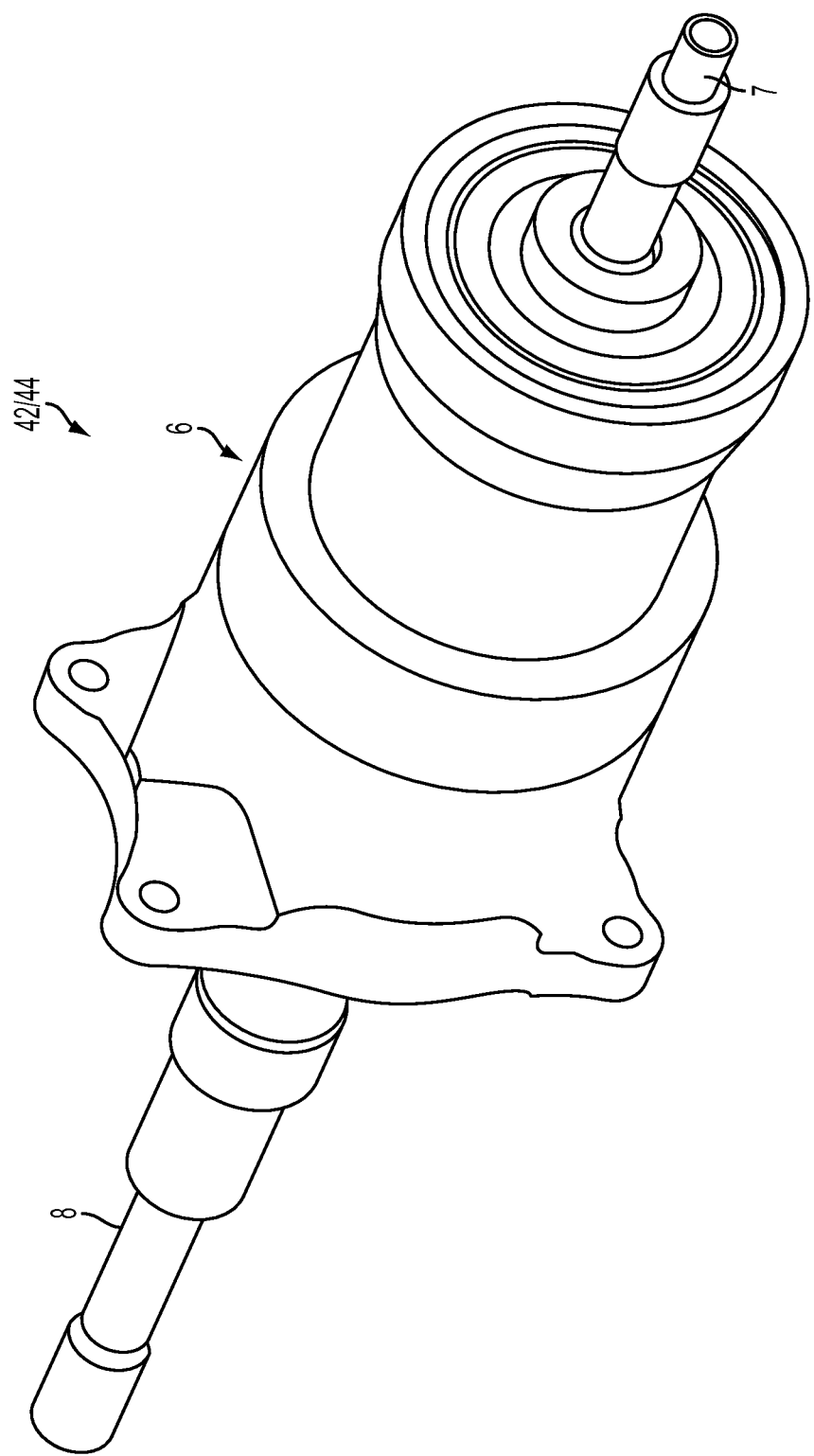
FIG. 3 is a perspective view of a rotary device in accordance with embodiments.
Figure 6:
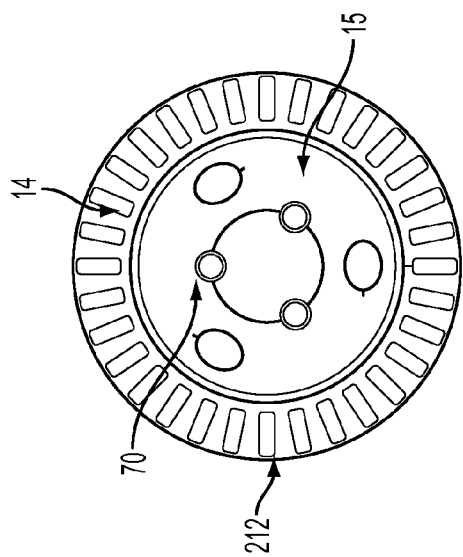
FIG. 6 is a cross-sectional view of the rotary device of FIG. 4 taken along line B-B.

With reference to FIGS. 1 and 2, an aircraft 1 includes a fuselage 2, static aerodynamic surfaces 3 (i.e., wings) extending outwardly from the fuselage 2, dynamic aerodynamic surfaces and engines 5. The engines 5 may be attached to the static aerodynamic surfaces 3 or to the fuselage 2 and are configured to generate thrust for the aircraft 1. The dynamic aerodynamic surfaces may be provided as flap control surfaces (hereinafter referred to as "flaps") 40, which are disposed at trailing edges of the static aerodynamic surfaces 3, or slat control surfaces (hereinafter referred to as "slats") 41, which are disposed at leading edges of the static dynamic surfaces 3. The flaps 40 are configured to be pivoted relative to the static aerodynamic surfaces 3 by flap actuators 42, which are controlled and driven by a flap power drive unit 43. Similarly, the slats 41 are configured to be pivoted relative to the static aerodynamic surfaces 3 by slat actuators 44, which are controlled and driven by a slat power drive unit 45. As shown in FIGS. 2 and 3, the flap actuators 42/slat actuators 44 of the aircraft 1 may each include a rotary device assembly 6 operably coupled to at least one of the static aerodynamic surfaces 3 and to an associated one or more of the flaps 40 and the slats 41 to execute the pivoting actions thereof.

The rotary device assembly 6 is configured to transmit a first torque from an input shaft 7, which is rotatable relative to the static aerodynamic surface 3, to an output shaft 8, which is non-rotatable relative to the dynamic aerodynamic surface 4. By way of such torque transmission, the rotary device assembly 6 is able to control a pivoting of the dynamic aerodynamic surface 4 with independently pre-loaded no-back capability and, in some cases, with no-back capability and torsional lock-up capability.

As will be described below, the no-back capability of the rotary device assembly serves to prevent second torque, which may be applied to the output shaft 8 by external forces acting on the flap 40/slat 41 from being transmitted to the input shaft 7 in an event the second torque deceeds (i.e., is less than) a torque-limiting threshold. The torsional lock-up capability serves to prevent an overload of a torque generating device, such as the flap power drive unit 43 and the slat power drive unit 45, to which the input shaft 7 is coupled in an event the second torque exceeds the torque-limiting threshold.

With reference to FIG. 4, the rotary device assembly 6 includes the input shaft 7, which is coupled to the flap power drive unit 43 or the slat power drive unit 45 and which is rotatable relative to the static aerodynamic surface 3 (see FIGS. 2 and 3) in accordance with torque being generated by the flap power drive unit 43 and the slat power drive unit 45, the output shaft 8, which is non-rotatable relative to the flap 40/slat 41, and a rotary device 10. The rotary device 10 is operably disposed to transmit first torque from the input shaft 7 to the output shaft 8 along an input toque pathway 11 and is configured with the independently pre-loaded no-back capability to prevent the second torque from being transmitted to the input shaft 7 in the event the second torque deceeds a torque-limiting threshold and with both the no-back capability and torsional lock-up capability to prevent an overload of the flap power drive unit 43 and the slat power drive unit 45 in an event the second torque exceeds the torque-limiting threshold.

The rotary device assembly 6 further includes an actuator or first support housing 12, bearing elements 13 and a second support housing 14. The first support housing 12 may be supportively disposed within the static aerodynamic surface 3 and the bearing elements 13 are disposed between the first support housing 12 and the input shaft 7 to thereby rotatably support the input shaft 7 in the support housing 12. The second support housing 14 may be static relative to the static aerodynamic surface 3 and may be configured as an anchor to which the rotary device 6 may be anchored.

The rotary device 6 also includes an input portion and an output portion, both of which will now be described with continued reference to FIG. 4 and with additional reference to FIGS. 5-8. The input portion includes a ball ramp thrust plate 15, an output cone shaft 16 and (e.g., three) spherical balls 17. The ball ramp thrust plate 15 extends outwardly from the input shaft 7 and is torsionally coupled to the input shaft 7 via a roller 70, a spline or another suitable device.

The output shaft 8 is torsion coupled to the output cone shaft 16 by a spline or other suitable means and is pre-loaded by a spring (hereinafter referred to as a "first elastic element") 18 such that the output cone shaft 16 is rotatable with the output shaft 8. The thrust plate 15 has a first axial surface 150, which is formed to define dimples 151, and the output cone shaft 16 has a second axial surface 160, which is formed to define three ramps 161. The first and second axial surfaces 150 and 160 are complementary and face toward one another in opposite axial directions.

The spherical balls 17 may each be disposed to partially sit within the dimples 151 on one side thereof and within the ramps 161 on the other side thereof. In this condition, first torque generated by the flap power drive unit 43 or the slat power drive unit 45 is provided to the input shaft 7 and the thrust plate 15, and from the thrust plate 15 to the spherical balls 17 and from the spherical balls 17 to the output cone shaft 16 and the output shaft 8. However, while the spherical balls 17 cannot be forced laterally out of the dimples 151, the spherical balls 17 can be forced or driven laterally out of the ramps 161 along ramped portions 162, which are each shallower compared to the rest of the rims of the ramps 161 and the rims of the dimples 151 as will be described below.

The first elastic element 18 is pre-loaded to effectively sandwich the spherical balls 17 between the first and second axial surfaces 150 and 160 with a force that maintains respective positions of the spherical balls within the dimples 151 and the ramps 161 to thereby define a torque-limiting threshold. That is, as long as the second torque deceeds the torque-limiting threshold, the spherical balls 17 will remain disposed in the dimples 151 and the ramps 161. However, once the second torque exceeds the torque-limiting threshold, the spherical balls 17 will be driven along the ramped portions 162 and thus removed from at least the ramps 161. The combination of the output cone shaft 16, the spherical balls 17, the first elastic element 18, the dimples 151 and the ramps 161 may be collectively referred to as a ball ramp assembly.

As shown in FIG. 4, the output cone shaft 16 has an exterior surface that has an elongate portion and a distal end that is formed to define a dynamic cone portion 19. The dynamic cone portion 19 includes a conical surface 190 having radial and axial facing components. With the dynamic cone portion 19 formed as such, the output portion of the rotary device 6 includes a first torque pathway 20 and a second torque pathway 21.

The first torque pathway 20 is activated in the event the second torque deceeds the torque-limiting threshold. In such cases, the pre-load of the first elastic element 18 causes the second torque to be transmitted from the output cone shaft 16 to a skewed bearing set (hereinafter referred to as a "first skewed roller assembly") 201 via the thrust plate 15 with the first skewed roller assembly 201 being operably coupled to the first support housing 12. Thus, the first torque pathway 20 directs the second torque away from the input shaft 7.

The second torque pathway 21 also directs the second torque away from the input shaft 7 and, in addition, adds the second torque to a torque gain generated by a cone portion engagement to be described below. The second torque pathway 21 includes a static cone portion 211, which includes a conical surface 212 having radial and axial facing components complementing those of the conical surface 190 of the dynamic cone portion 19 and is coupled to the second support housing 14.

The second torque pathway 21 is activated in the event the second torque exceeds the torque-limiting threshold, in which case the spherical balls 17 will be driven along the ramped portions 162 and thus removed from at least the ramps 161 such that the output cone shaft 16 is forced radially outwardly. With the output cone shaft 16 being forced radially outwardly, the dynamic cone portion 19 engages with the static cone portion 211 and resulting gain from the engagement provides for a torsional lock-up of the input portion of the rotary device 6 due to axial loading proportional to the second torque being reacted to by second skewed roller assembly 212. This results in a lock-up of the second skewed roller assembly 212, which creates a torsional ground for the engaged dynamic and static cone portions 19 and 211. The dynamic cone portion 19, the static cone portion 211, the first skewed roller assembly 201 and the second skewed roller assembly 212 may be collectively referred to as a high gain cone brake assembly.

In accordance with embodiments, the second skewed roller assembly 212 may be provided as a pre-loaded skewed roller assembly operably disposed between the static cone portion 211 and the thrust plate 15. This pre-loaded skewed roller assembly includes a spring set (hereinafter referred to as a "second elastic element") 22, which is anchored on the second support housing 14, and a thrust bearing assembly (hereinafter referred to as a "skewed roller bearing") 23, which is coupled to a distal end of the second elastic element 22. The second elastic element 22 may be provided as a wave spring that acts as an independent pre-loading spring that in turn allows for pre-loading of the second skewed roller assembly 212 without negatively impacting activation load requirements of cone brake ball ramp assembly and provides for no-back drag torque to mitigate unintended rotation/creep over all load conditions and vibration environments.

In an operation of the rotary device 10, the input shaft 7 is torsionally coupled to the ball ramp thrust plate 15 via roller 70 as noted above. The ball ramp thrust plate 15 is also axially pre-loaded by the second elastic element 22. The skewed roller bearing 23 provides limited torsional friction between the ball ramp thrust plate 15 and the second elastic element 22 with the second elastic element 22 providing an axial load to the first skewed roller assembly 201. The first skewed roller assembly 201 may be provided with an anti-rotation feature 2010 and a number of needle rollers 2011 skewed at about a 45° angle, for example. The skewed angle of the needle rollers 2011 and the load produced by the second elastic element 22 produces torsional drag on the ball ramp thrust plate 15 that is proportional to the applied axial load. The load value of the second elastic element 22 and the skew angle of the needle rollers 2011 of the first skewed roller assembly 201 can be varied to any combination to provide an appropriate torsional drag on the ball ramp thrust plate 15. In addition, the first skewed roller assembly 201 may be provided as a single feature or as multiple stacked features.

The torsional drag created by the second elastic element 22 may be sized to react to back drive loads applied to the output shaft 8 and which are considered within the normal operating threshold (i.e., the back drive loads are less than the torque-limiting threshold). As such, this constant drag will eliminate chatter that some other no-back designs can produce by an engaging and disengaging design approach.

Figure 8:
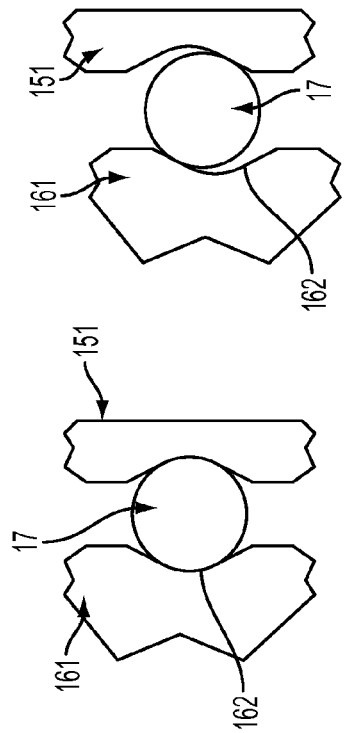
FIG. 8 are side views of operating conditions of a ball ramp mechanism of the rotary device of FIG. 4.
Figure 5:
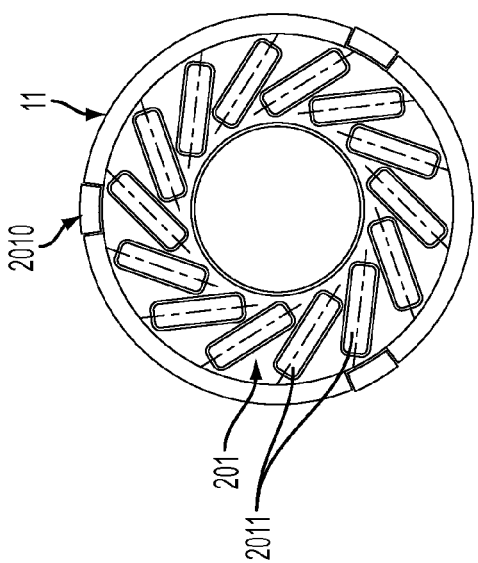
FIG. 5 is a cross-sectional view of the rotary device of FIG. 4 taken along line A-A.
Figure 7:
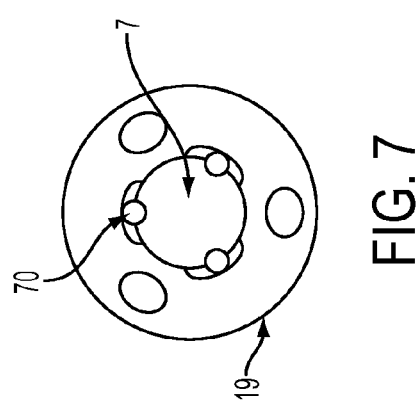
FIG. 7 is a cross-sectional view of the rotary device of FIG. 4 taken along line C-C.
Figure 9:
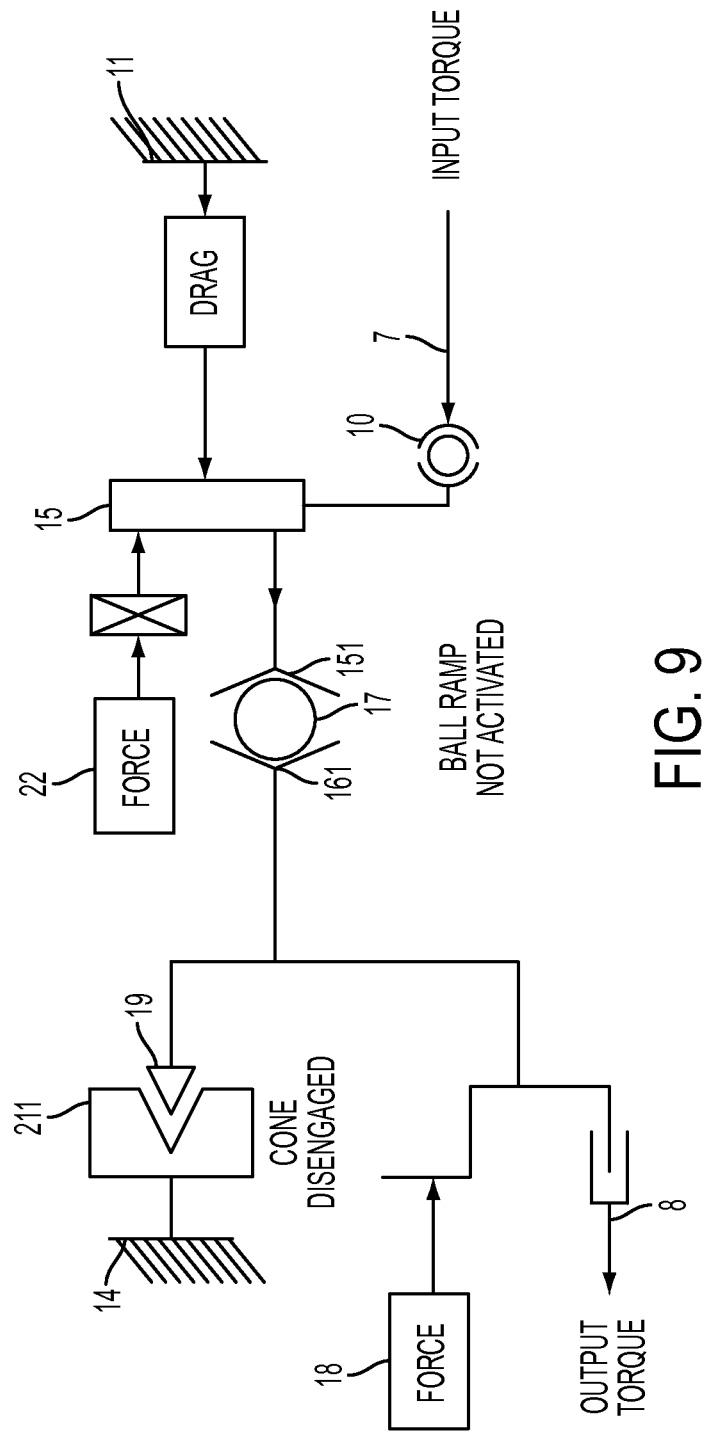
FIG. 9 is a schematic diagram of an operation of the rotary device of FIG. 4 in accordance with alternative embodiments.

With reference to FIGS. 8 and 9, under a normal and intact operating condition where input torque opposes loadings below the torque-limiting threshold, the input torque applied to the input shaft 7 and into ball ramp thrust plate 15 via roller 70 is transmitted to the ball ramp assembly (see also input torque pathway 11 of FIG. 4). The ball ramp assembly then transmits a torsional load to the dynamic cone assembly 19 and the output shaft 8 through the drag torque generated by way of bias created by the first elastic element 18, which loads the ball ramp assembly to force the spherical balls 17 to the bottom of the ramps 161 as shown in the left-side image of FIG. 8. The ramped portions 162 of the ramps 161 will have an appropriate angle in combination with the bias applied by the first elastic element 18 to allow for the torsional transmission without causing the spherical balls 17 to be driven up the ramped portions 162. Torque transmitted to the dynamic cone portion 19 is then reacted through the interface between the dynamic cone portion 19 and the output shaft 8 (this interface may include a spline or other suitable torque transmitting device). The dynamic cone portion 19 and the static cone portion 211 have a clearance maintained by the force created by the first elastic element 18 such that the cones remain disengaged.

Figure 10:
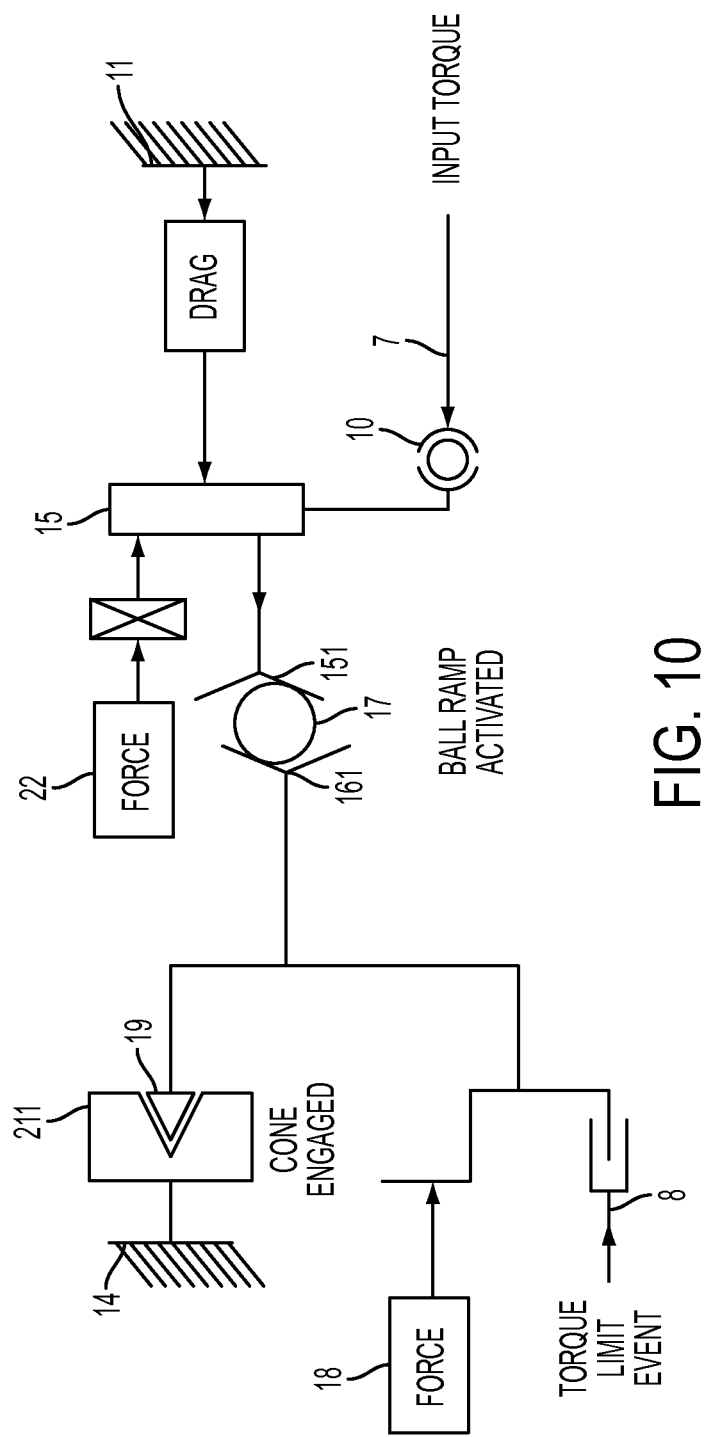
FIG. 10 is a schematic diagram of an operation of the rotary device of FIG. 4 in accordance with alternative embodiments.

With reference to FIGS. 8 and 10, under a torque limiting event or a back driving event, with torsional loads above a normal operating load threshold, the spherical balls 17 will be forced up the ramped portions 162 of the ramps 161 as shown in the right-side image of FIG. 8 to thereby generate an axial force that is proportional to torque applied to the ball ramp assembly. The axial force is reacted by the now-engaged cones and the first skewed roller assembly 201. The axial force reacted through the ball ramp thrust plate 15 to the first skewed roller assembly 201 creates a drag torque that is proportional to the axial force applied to the first skewed roller assembly 201, which has a higher magnitude than the drag torque created by the first elastic element 22, while the cone engagement creates a high gain braking condition.

The high gain braking condition may be characterized as a wedging action between the engaged dynamic cone portion 19 and the static cone portion 211, which is torsionally grounded to the second support housing 14. The high gain (>1) of the cone engagement creates an internal torque resistance that is greater than the torque applied to the output shaft 8 based on the wedging action of the cones generated by the axial force of the ball ramp assembly. To disengage the cones, a torque must be applied to the input shaft 7 in an opposite direction of rotation from the normal direction of rotation such that the ball ramp thrust plate 15 is rotated to thereby allow the spherical balls 17 to move back down the ramped portions 162 of the ramps 161.

In accordance with embodiments, materials for the various components discussed above may include at least one or more of steels, aluminum and bronze with the various components further having a Teflon™, Kevlar™, Carbon or Ceramic coating.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A rotary device assembly, comprising:
an input shaft coupled to a torque generating device;
an output shaft; and
a rotary device comprising:
an output portion with a skewed roller assembly loaded by pre-load springs and a ball ramp assembly such that the skewed roller assembly provides variable drag torques which are variable based on the loads of the pre-load springs
and the ball ramp assembly; and
an input portion comprising a thrust plate rotatable with the input shaft and having a dimple defining first axial surface, an output cone shaft rotatable with the output shaft and having a ramp defining second axial surface complementary to the first axial surface and spherical balls disposable in the dimples and the ramps by which the first torque is transmittable from the input shaft to the output shaft, the spherical balls being drivable out of the ramps in the event the second torque exceeds a torque-limiting threshold, and the rotary device being disposed to transmit first torque from the input shaft to the output shaft and configured with:

no-back capability to prevent second torque applied to the output shaft from being transmitted to the input shaft in an event the second torque deceeds the torque-limiting threshold, and the no-back capability and torsional lock-up capability to prevent an overload of the torque generating device in an event the second torque exceeds the torque-limiting threshold, the rotary device further comprising an elastic element by which the output cone shaft is coupled to the output shaft, the elastic element being pre-loaded to prevent engagement of the torsional lock-up capability in the event the second torque deceeds the torque-limiting threshold.

2. The rotary device assembly according to claim 1, wherein the torque generating device comprises a flight control actuation system.

3. The rotary device assembly according to claim 1, further comprising:
a first support housing;
bearing elements by which the input shaft is rotatably disposed in the support housing; and
a second support housing to which the rotary device is anchored.

4. A rotary device assembly, comprising:
an input shaft coupled to a torque generating device;
an output shaft; and
a rotary device comprising:
an output portion with a skewed roller assembly loaded by pre-load springs and a ball ramp assembly such that the skewed roller assembly provides variable drag torques which are variable based on the loads of the pre-load springs and the ball ramp assembly; and
an input portion comprising a thrust plate rotatable with the input shaft and having a dimple defining first axial surface, an output cone shaft rotatable with the output shaft and having a ramp defining second axial surface complementary to the first axial surface and spherical balls disposable in the dimples and the ramps by which the first torque is transmittable from the input shaft to the output shaft, the spherical balls being drivable out of the ramps in the event the second torque exceeds a torque-limiting threshold, the rotary device being disposed to transmit first torque from the input shaft to the output shaft and configured with:

no-back capability to prevent second torque applied to the output shaft from being transmitted to the input shaft in an event the second torque deceeds the torque-limiting threshold, and the no-back capability and torsional lock-up capability to prevent an overload of the torque generating device in an event the second torque exceeds the torque-limiting threshold, wherein the output cone shaft comprises a dynamic cone portion and the rotary device comprises an output portion comprising:

a first torque pathway, which is activated in the event the second torque deceeds the torque-limiting threshold, by which the second torque is directed away from the input shaft; and a second torque pathway including a static cone portion, which is activated in the event the second torque exceeds the torque-limiting threshold, by which the second torque is directed away from the input shaft and added to a torque gain generated by engagement between the dynamic cone portion and the static cone portion.

5. A rotary device assembly, comprising:
an input shaft coupled to a torque generating device;
an output shaft; and
a rotary device disposed to transmit first torque from the input shaft to the output shaft, the rotary device comprising an input portion comprising a thrust plate rotatable with the input shaft and having a dimple defining first axial surface, an output cone shaft rotatable with the output shaft and having a ramp defining second axial surface complementary to the first axial surface and spherical balls disposable in the dimples and the ramps by which the first torque is transmittable from the input shaft to the output shaft, the spherical balls being drivable out of the ramps in the event the second torque exceeds a torque-limiting threshold, wherein the output cone shaft comprises a dynamic cone portion and the rotary device comprises an output portion comprising a first torque pathway, which is activated in the event the second torque deceeds the torque-limiting threshold, by which the second torque is directed away from the input shaft and a second torque pathway including a static cone portion, which is activated in the event the second torque exceeds the torque-limiting threshold, by which the second torque is directed away from the input shaft and added to a torque gain generated by engagement between the dynamic cone portion and the static cone portion, the rotary device being configured with:
no-back capability to prevent second torque applied to the output shaft from being transmitted to the input shaft in an event the second torque deceeds a torque-limiting threshold, and the no-back capability and torsional lock-up capability to prevent an overload of the torque generating device in an event the second torque exceeds the torque-limiting threshold, wherein the output portion further comprises:
a skewed roller assembly operably disposed between the thrust plate and a support housing; and
a pre-loaded skewed roller assembly operably disposed between the static cone portion and the thrust plate such that the skewed roller assembly is loaded by two independent means, one by the pre-load springs and the other by the ball ramp assembly such that the skewed roller assembly can provide drag torques that are variable based on the loads created by the pre-load springs and the ball ramp assembly.

6. The rotary device assembly according to claim 1, wherein the no-back capability is independently pre-loaded.

7. A flight control actuation system, comprising:
a static surface;
a dynamic surface, which is pivotable relative to the static surface; and
a rotary device assembly comprising an output portion with a skewed roller assembly loaded by pre-load springs and a ball ramp assembly such that the skewed roller assembly provides variable drag torques which are variable based on the loads of the pre-load springs and the ball ramp assembly, the rotary device assembly being operably coupled to the static and dynamic surfaces and configured to transmit first torque from an input shaft to an output shaft to control a pivoting of the dynamic surface with:

an independently pre-loaded no-back capability to prevent second torque applied to the output shaft from being transmitted to the input shaft in an event the second torque deceeds a torque-limiting threshold, and the no-back capability and torsional lock-up capability to prevent an overload of a torque generating device to which the input shaft is coupled in an event the second torque exceeds the torque-limiting threshold, wherein the rotary device assembly comprises a ball-ramp assembly and the rotary device assembly further comprises a high gain cone brake assembly.

8. The flight control actuation system according to claim 7, wherein the static surface comprises a wing and the dynamic surface comprises a flap or a slat.

9. The flight control actuation system according to claim 7, wherein the second torque is applied to the output shaft via the dynamic surface.

10. The flight control actuation system according to claim 7, wherein the torque generating device comprises a flight control actuation system motor.

11. The flight control actuation system according to claim 7, wherein the rotary device assembly comprises:
an input torque pathway; and
first and second torque pathways disposed in a reverse orientation relative to the input torque pathway.

* * * * *